United States Patent [19]

Murakami et al.

[11] Patent Number: 5,930,251
[45] Date of Patent: *Jul. 27, 1999

[54] MULTIMEDIA INFORMATION PROCESSING SYSTEM

[75] Inventors: Tokumichi Murakami; Kazuhiro Matsuzaki; Yoshiaki Kato; Hideo Ohira, all of Tokyo, Japan

[73] Assignee: Mitsubishi Denki Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/751,770

[22] Filed: Nov. 8, 1996

[30] Foreign Application Priority Data

Feb. 1, 1996 [JP] Japan .................. 8-016754

[51] Int. Cl.⁶ ............................. H04L 12/56
[52] U.S. Cl. ................ 370/395; 370/474; 370/532
[58] Field of Search .................. 370/389, 392, 370/395, 396, 397, 398, 399, 400, 474, 532, 536, 542; 348/13, 16, 6, 7, 8, 9, 10, 461, 462, 465, 467

[56] References Cited

U.S. PATENT DOCUMENTS

| | | | |
|---|---|---|---|
| 5,027,400 | 6/1991 | Baji et al. | 380/20 |
| 5,301,191 | 4/1994 | Otani | 370/468 |
| 5,363,433 | 11/1994 | Isono | 370/390 |
| 5,509,007 | 4/1996 | Takashima et al. | 370/391 |
| 5,544,161 | 8/1996 | Bigham et al. | 370/397 |
| 5,550,593 | 8/1996 | Nakabayashi | 348/465 |
| 5,594,736 | 1/1997 | Tatsumi et al. | 370/474 |
| 5,600,633 | 2/1997 | Jaisingh et al. | 370/277 |
| 5,627,836 | 5/1997 | Conoscenti et al. | 370/397 |
| 5,671,226 | 9/1997 | Murakami et al. | 370/474 |
| 5,684,799 | 11/1997 | Bigham et al. | 370/397 |
| 5,734,653 | 3/1998 | Hiraiwa et al. | 370/395 |

OTHER PUBLICATIONS

Digital Video, *IEEE Spectrum*, R.K. Jurgen, Contributing Editor, Mar. 1992, pp. 24–30.

Hattori et al. (1993) A Video CODEC for Digital SNG System, Mitsubishi Denki Giho: vol. 67(7) pp. 33–38 1993.

*Primary Examiner*—Chi H. Pham
*Assistant Examiner*—Kwang B Yao

[57] ABSTRACT

In a multimedia information processing system, a relay station comprises: transmission decoding section for reproducing a fixed packets stream from received transmission signal from a transmitter; signal change processing means for executing changing process for the fixed packets stream; and transmission coding section for producing a transmission signal corresponding to a characteristic of a transmission line from the fixed packets stream. The construction for exchanging signals between different transmission means is simplified. Thus, it is achieved to exchange contents of media between different transmission means by a simple construction.

8 Claims, 13 Drawing Sheets

MULTIMEDIA INFORMATION PROCESSING SYSTEM

BACKGROUND OF THE INVENTION

1. Field of the Invention

The present invention relates to a multimedia information processing system in which a digitalized video signal, an audio signal and other data are coded, multiplexed, and then, transmitted or stored, and the transmitted signal or the stored signal are demultiplexed, and then, decoded to generate the video signal, audio signal and other data. As specific applications of the multimedia information processing system, there are a video on demand (VOD), a digital broadcasting system, and a video conference system.

2. Description of the Prior Art

FIG. 10 is a block diagram showing a structure of a video encoder (transmitter) forming a conventional multimedia information processing system described in "A Video Codec for Digital Satellite News gathering Systems", Mitsubishi Electric Corporation Technical Publication, Vol. 67, No. 7, pp 33–38, 1993.

In FIG. 10, reference numeral 91 is an information-source coding section which inputs a video signal 101, an audio signal 102, and the other data signal 103 and executes data compression for those signals. In the information-source coding section 91, a video coding portion 51 executes information-source coding of the video signal 101 to generate the video coded bits sequence 111. An audio coding portion 512 executes information-source coding of one or more audio signals 102 to generate one or more audio coded bits sequences 112. The data coding portion 513 executes various processings concerning the data signal 103 relating to the video signal 101 or the audio signal 102 to generate a data coded bits sequence 113.

A media multiplexing section 92 multiplexes the video coded bits sequence 111, the audio coded bits sequence 112 and the data coded bits sequence 113 from the information-source coding section 91 to generate one multiplexed bits sequence 122. A transmission processing section 93 provides the multiplexed bits sequence 122 with scramble processing and error correction coding in accordance with the types and characteristics of the transmission line. The transmission processing section 93 further executes channel multiplexing processing for the multiplexed bits sequence 122 and one or more other multiplexed bits sequences 123. Furthermore, the transmission processing section 93 executes the formation of a transmission frame and modulating processing and so on are executed to generate a transmission signal 141.

FIG. 11 is a block diagram showing a structure of a video decoder (receiver) forming the multimedia information processing system described in the above report. In FIG. 11, reference numeral 96 denotes a receive processing section which receives the transmission signal 141, executes demodulating processing, synchronization of the transmission frame, regeneration of the transmission frame and separation of the channel multiplexing processing to select a specific channel signal. The receive processing section 96 further executes error detecting processing, error correcting processing and descramble processing or the like to reproduce multiplexed bits sequence 122 or one or more other multiplexed bits sequences 123.

A media demultiplexing section 95 separates the multiplexed bits sequence 122 into the video coded bits sequence 111, one or more audio coded bits sequences 112 and one or more data coded bits sequences 113.

An information-source decoding section 94 inputs the video coded bits sequence 111, one or more audio coded bits sequences 112 and one or more data coded bits sequences 113 and also outputs the video signal 101, one or more audio signals 102 and one or more data signals 103. In the information-source decoding section 94, a video decoding portion 514 executes information-source decoding of the video coded bits sequence 111 to reproduce the video signal 101. An audio decoding portion 515 executes information-source decoding of the one or more audio coded bits sequences 112 to reproduce the audio signal 102 relating to the video signal 101. A data decoding portion 516 executes various reverse processings to the data coded bits sequence 113 to reproduce the data signal 103 relating to the video signal 101 and audio signal 102.

FIG. 13 is an explanatory diagram showing a general function of the transmission processing section 93 and the receive processing section 96. As shown in FIG. 13, the transmission processing section 93 inputs multiplexed bits sequences and produces transmission signals by performing a framing process, modulation process and physical layer process. The receive processing section 96 receives transmission signals and reproduces multiplexed bits sequences by performing physical layer process, demodulation process and deframing process.

Operations in the transmission side of the multimedia information processing system will now be described. The information-source coding section 91 reduces redundant components of the respective signals by use of information-source coding method. Information of the video signal 101 and the one or more audio signals 102 which are accompanied therewith are coded in a video coding portion 511 and audio coding portion 512 respectively. Information of the data signal 103 including synchronization signals and control signals relating to the video signal and audio signal are also coded in a data coding portion 513 as in the case of the video signal and audio signal, thereby converting the data structure to form one or more data coded bits sequences 113.

The media multiplexing section 92 multiplexes the video coded bits sequence 111, audio coded bits sequence 112 and data coded bits sequence 113 into one multiplexed bits sequence 122. The multiplexing is executed by use of a given frame as a unit. FIG. 12 is an explanatory view explaining multiplexed frame generated in the media multiplexing section 92. As shown in FIG. 12, a predetermined sized multiplexed frame 80 is composed of a synchronizing information area 81 for securing the synchronization of the multiplexed frame, a video information area 82, audio information area 83 and a data information area 84. The video coded bits sequence 111, the audio coded bits sequence 112 and the data coded bits sequence 113 are provided in the video information area 82, the audio information area 83, and the data information area 84 respectively and are read out in the order shown with arrow in FIG. 12 (from the left upper portion to the right lower portion), so that the multiplexed bits sequence 122 is generated. To multiplex signals using such a multiplexed frame as a unit is referred to as "structure multiplexing" in this specification.

The transmission processing section 93 executes scramble processing for the multiplexed bits sequence 122 and adds error correcting codes to the multiplexed bits sequence 122. Further, the transmission processing section 93 executes channel multiplexing for the multiplexed bits sequence 122 and other one or more multiplexed bits sequences 123 to generate a transmission frame. The transmission processing section 93 then executes modulation processing or the like for the transmission frame to generate a transmission signal 141.

The scramble processing in the transmission processing section 93 will be described using FIG. 14(a). FIG. 14(a) shows one example of a circuit that realize a scramble processing referred to as a PN (Pseudo Noise) signal summing system. In FIG. 14(a), reference numeral 73a denotes a pseudo random number generator for scramble and 75 an exclusive-OR circuit. The random number generator 73a generates a pseudo random number sequence 74a responsive to an initial value 72a. The exclusive-OR circuit 75 executes exclusive-OR operation of original data 71 and the pseudo random number sequence 74 a as a bit unit to obtain scrambled data 76.

A structure of the error correction frame in a case where the transmission processing section 93 executes error correction coding will be described. FIG. 15 is a block diagram of an error correction frame 77 in a case where the Reed-Solomon (RS) code is used as the error correction code. In FIG. 15 reference numeral 78a denotes synchronizing information to establish synchronization of the error correction frame 77, 78b M bytes code word (RS (M, M− N) code word), 79a an information field which stores N bytes information symbols which is protected by the error correction coding, and 79b a check field which stores check symbols which is added to detect error detection.

A channel multiplexing method for the P channels in the transmission processing section 93 will be described with reference to FIG. 16. Each channel corresponds to each program in television broadcasting for example. A channel multiplexing frame 90 includes synchronizing information 90a to establish synchronization of the channel multiplexing frame 90. The channel multiplexing is executed by using the structure multiplexing system.

A transmission frame will be described with reference to FIG. 17. The transmission frame is defined in dependence on the characteristics of the transmission line. Various transmission frames are defined in accordance with the respective types such as the cable transmission, satellite wave transmission and ground wave transmission and so on. FIG. 17 shows one embodiment of a structure of a transmission frame. As shown in FIG. 17, a transmission frame 85 is composed of an additional information area 86 and a transmission information area (payload) 87. Timing information, synchronizing information and information that is used for securing the transmission line, or the like are contained in the additional information area 86. The information that forms the transmission frame 85 is read out in a desired order shown with the arrows in FIG. 17. After the transmission frame 85 was modulated, it is sent to a transmission line as a transmission signal 141.

Next, operations on the receive side of the multimedia information processing system will be described. The operations on the receive side is reverse to those on the transmission side, which were previously described. Namely, after the receive processing section 96 demodulated the received transmission signal 141, it establishes the synchronization of the transmission frame 85 and reproduces, using the synchronizing information in the additional information area 86, and takes out the transmission information area 87. In a case where a signal in the transmission information area 87 is channel multiplexed, the receive processing section 96 establishes the synchronization of the channel multiplexing frame 90 and reproduces, using the synchronizing information 90a, and separates the respective channel information. When each channel information is an error correction coded signal, the receive processing section 96 establishes synchronization of the error correction frame 77 and reproduces, using the synchronizing information 78a. After that, the receive processing section 96 detects errors and correct them.

Descramble processing in the receive processing section 96 will be described using FIG. 14(b). In FIG. 14(b), reference numeral 73b denotes a pseudo random number generator for descramble and 75 an exclusive-OR circuit. The pseudo random number generator 73b to which an initial value 72b is given generates a pseudo random number sequence 74b. The pseudo random number generator 73b in a descramble circuit has the same structure as the pseudo random number generator 73a shown in FIG. 14(a). The initial value 72a is the same as the initial value 72b. The value of the pseudo random number sequence 74a coincides with that of the pseudo random number sequence 74b.

The media demultiplexing section 95 separates the multiplexed bits sequence 122 into the video coded bits sequence 111, one or more audio coded bits sequences 112 and one or more data coded bits sequences 113. The generation of the multiplexing frame 80 necessary for the separation is executed by using synchronizing information contained in the synchronizing information area 81 within the multiplexing frame 80.

In the information-source decoding section 94, The video coded bits sequence 111, audio coded bits sequence 112, and data coded bits sequence 113 are respectively decoded through information-source decoding or various reverse processing by the video decoding section 514, audio decoding section 515 and data decoding section 516 to reproduce the video signal 101, the audio signal 102 relating to the video signal 101 and the data signal 103 relating to the video signal 101 or audio signal 102.

Since a conventional multimedia information processing system is constructed as described above, the processing contents in each processing section and the interface signal between the respective processing sections are fixedly indexed. Consequently, the conventional multimedia information lacks wide usableness.

Therefore, it is difficult to execute data exchange service among broadcasting system, communication system and storage system in computer. Further, it has been difficult to build hardware and add processing functions while maintaining interchangeable properties with other multimedia information processing systems.

Since, in the conventional multimedia information processing system, the video signal, audio signal, and other data have been structure-multiplexed by storing them in given areas in multiplexing frames, multiplexing processing difficult to deal with change in the transmission speed of information to be multiplexed from the respective media and existence of information from the respective media. Further, in a case where the number of media are large, the size of the multiplexing frame must be enlarged. As a result, long time has been required for establishing synchronization of the multiplexing frame on the receiver side.

In case the transmission line is a general line and the transmission signal is a modulated wave by Quadrature Amplitude Modulation (QAM) or Phase Shift Keying (PSK) for example, functions of the transmission processing section 93 and the receive processing section 96 are realized as shown in FIG. 13. However, in case the transmission line is an ATM network, the transmission processing section 93 and the receive processing section 96 should perform ATM physical layer process, ATM layer process, and ATM adaptation layer process as shown in FIG. 18. In case contents of media are exchanged between a multimedia information processing system connected to an ATM network and another multimedia information processing system connected to a general transmission line, adapters are required.

The adapters must include both functions shown in FIGS. 13 and 18 if multiplexed bits streams in both systems are same.

SUMMARY OF THE INVENTION

The present invention has been made to solve the above problems. The object of the present invention is to provide a multimedia information processing system which can exchange contents of media easily if different transmission means are used and to provide a multimedia information processing system which can rapidly transmit contents to another system through a plurality of transmission means.

In a multimedia information processing system according to the present invention, a transmitter comprises: information-source coding processing means for inputting a plurality of media information and coding each media information independently to other media information; packet multiplexing means for producing a multiplexed stream by packet-multiplexing coded bits streams produced by the information-source coding processing means, each stream independent to other streams; fixed length packet producing means for allocating the multiplexed stream into a fixed length packet; and transmission coding means for producing a transmission signal from the fixed length packet.

According to such a structure, processes from a process of inputting elements of media to a process of remultiplexing and transmitting are constructed hierarchically. Thus, such efficient multiplexing process is performed as is free from a difference between output speeds of information of media to be multiplexed, lack of media and so on.

The fixed length packet producing means allocates the multiplexed stream into an ATM cell. Thus, the system can easily adapt to ATM cells which are fixed length packets.

The transmission coding means executes transmission processing of ATM physical layer. Thus, it becomes to be possible to transmit signals which adapt to a characteristic of the ATM network.

In a multimedia information processing system according to the present invention, a receiver comprises: transmission decoding means for reproducing a fixed packets stream from received transmission signal; fixed length packet disassembling means for extracting a multiplexed stream from the fixed packets stream; media separating means for reproducing coded bits streams for respective media from the multiplexed stream, each bits stream independent to other bits stream; and information-source decoding processing means for decoding the coded bits streams for respective media.

According to such a structure, processes from a receiving process to reproducing process of elements of media are constructed hierarchically. Thus, such efficient demultiplexing process is performed as is free from a difference between input speeds of information of media, lack of media and so on.

The fixed length packet disassembling means extracts the multiplexed stream from an ATM cells stream. Thus, the system can easily adapt to ATM cells which are fixed length packets.

The transmission decoding means executes receive processing of ATM physical layer. Thus, it becomes to be possible to receive and decode transmit signals which adapt to a characteristic of the ATM network.

In a multimedia information processing system according to the present invention, a relay station comprises: transmission decoding means for reproducing a fixed packets stream from received transmission signal from a transmitter; signal change processing means for executing changing process for the fixed packets stream; and transmission coding means for producing a transmission signal corresponding to a characteristic of a transmission line from the fixed packets stream.

The construction for exchanging signals between different transmission means is simplified. Thus, it is achieved to exchange contents of media between different transmission means by a simple construction. In addition, exchanging of contents is performed faster than that in the conventional system.

The transmission decoding means reproduces an ATM cells stream as the fixed packets stream, and the transmission coding means produces the transmission signal from said ATM cells stream.

The signal change processing means includes broadcast processing means for executing broadcast control so as to transmit the transmission signal to a plurality of receivers.

The broadcast processing means writes addresses of receivers in headers of the fixed length packets.

According to such a structure, the broadcast processing section can add destination addresses to the fixed packets stream directly. Thus, a broadcast transmission is easily achieved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Embodiments of the multimedia information processing system according to the present invention will be described below, with reference to drawings.

Embodiment 1

Figure 1:
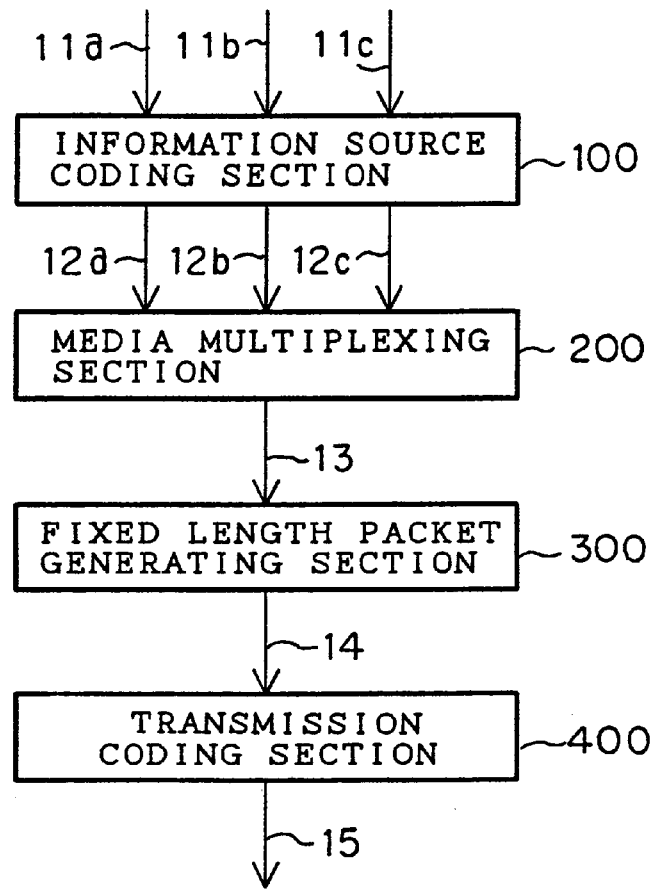
FIG. 1 is a block diagram showing a structure of a receiver in a multimedia information processing system according to the first embodiment of the present invention.

FIG. 1 is a block diagram showing another transmitter of a multimedia information processing system according to the present invention. In FIG. 1, reference numeral 100 denotes an information-source coding section for performing information-source coding a video signal 11a, an audio signal 11b and a data signal 11c, 200 a media multiplexing section for producing a multiplexed stream 12 by multiplexing coded bits stream 12a, 12b, 12c from the information-source coding section 100, 300 a fixed length packet generating section for producing a fixed length packet 14 from a multiplexed stream 13, and 400 a transmission coding section for producing a transmission signal 15.

Figure 2:
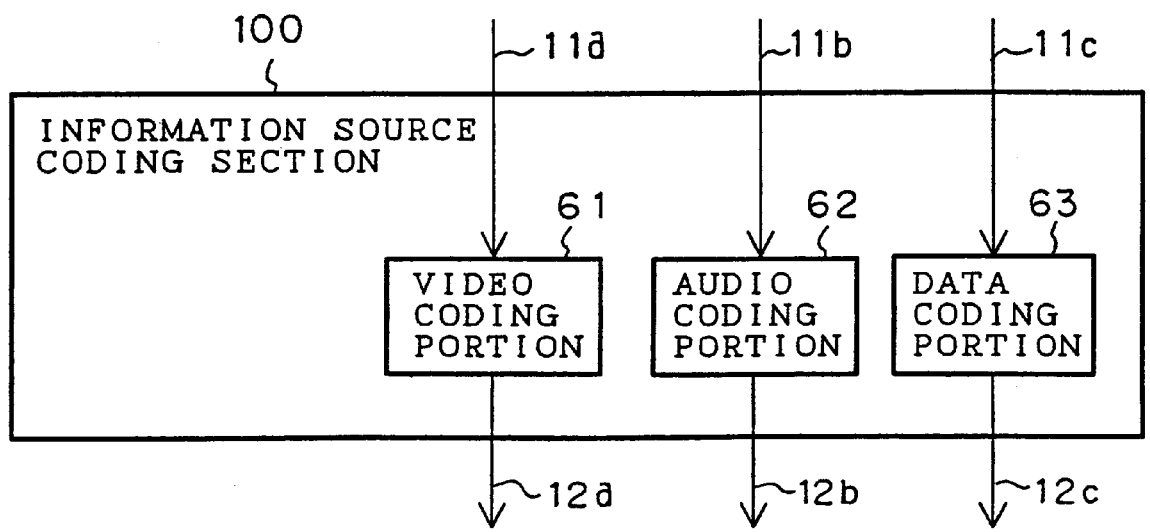
FIG. 2 is a block diagram showing a construction of information-source coding section.

FIG. 2 is a block diagram showing a construction of the information-source coding section 100. As shown in FIG. 2, the information-source coding section 100 comprises a video coding portion 61 coding video signals 11a, an audio coding portion 62 coding audio signals 11b and a data coding portion 63 coding data signals 11c.

Next, operation is described. In the information-source coding section 100, the video coding portion 61 cuts redundant components of the video signal 11a by using one of a plurality of information-source coding methods and produces a video coded bits stream 12a. The video coding portion 61 outputs the video coded bits stream 12a. The audio coding portion 62 cuts redundant components of the audio signal 11b by using one of a plurality of information-source coding methods and produces an audio coded bits stream 12b. The audio coding portion 62 outputs the audio coded bits stream 12b. The data coding portion 63 inputs synchronizing signals, controlling signals and so on of the video signal 11a and the audio signal 11b, and cuts redundant components of the data signal 11c as same as those of the video signals 11a and the audio signals 11b. If required, the data coding portion 63 changes data structure of data signal 11c and produces a data coded bits stream 12c. The data coding portion 63 outputs the data coded bits stream 12c.

The media multiplexing section 200 performs a media multiplexing of coded bits streams 12a, 12b, 12c according to ISO/IEC 13813-1 (MPEG-2 SYSTEM) standard. Here, the media multiplexing section 200 performs multiplexing in a unit of a packet and produces a multiplexed stream so-called transport stream (TS) or program stream (PS).

Figure 3:
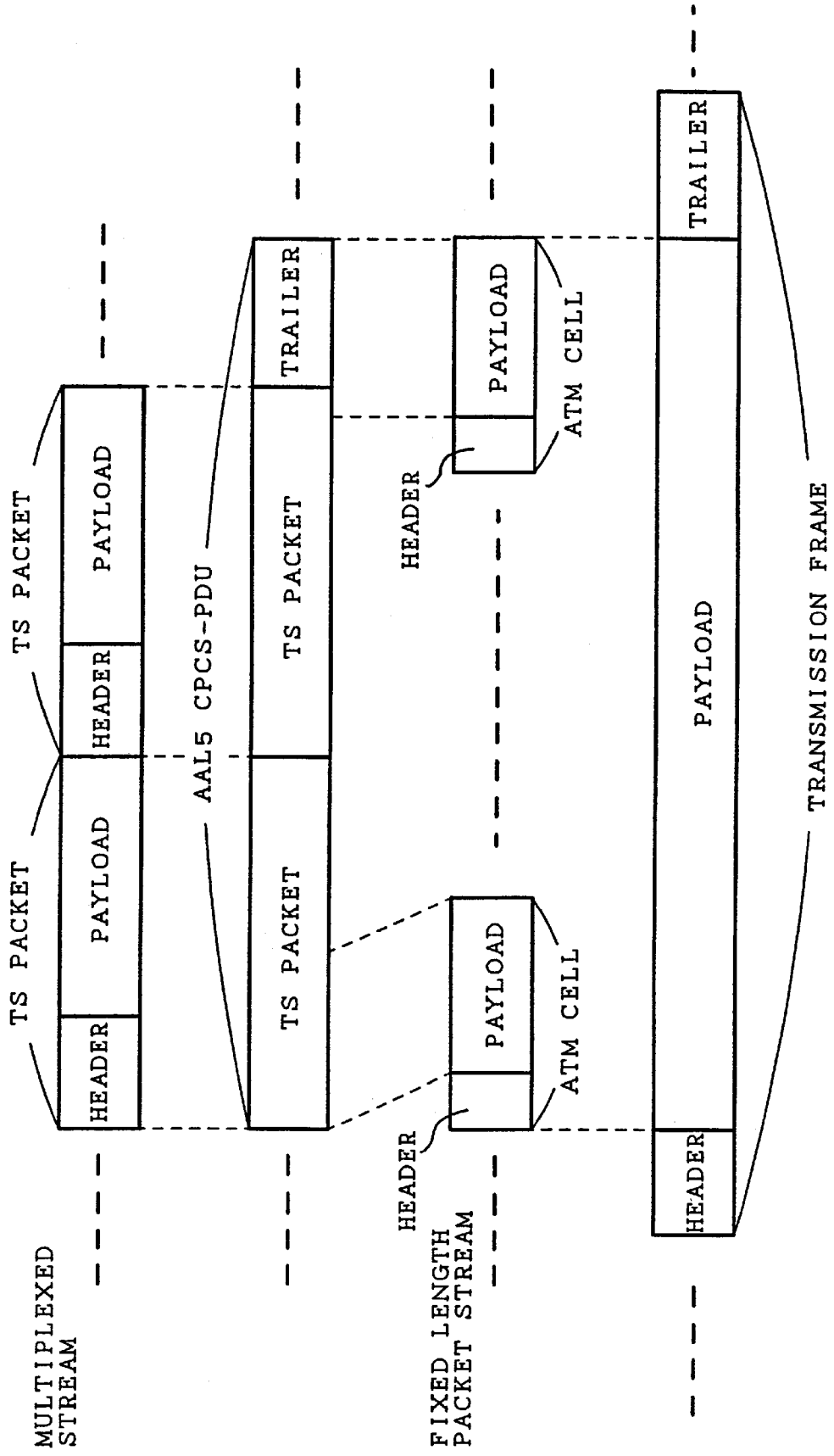
FIG. 3 is an explanatory diagram showing a reference between a multiplexed bits stream using TS packet and a fixed length packet using ATM cell.

The fixed length packet generating section 300 allocates multiplexed stream 13 into a fixed length packet 14. FIG. 3 is an explanatory diagram showing a reference between a multiplexed stream 13 using TS packet and a fixed length packet 14 using an ATM cell. As shown in FIG. 3, two TS packets are allocated into a payload on CPCS (Common Part Convergence Sublayer)-PDU (Protocol data Unit) of ATM adaptation layer (AAL), type 5. Here, a TS packet comprises 188 bytes.

In case PS packets are allocated into an ATM cell, it is suitable that they are set in a CPCS-PDU payload of AAL, type 5 such that a leading portion of the PS packet, generally variable length packet, coincides to a leading portion of the payload. It is also suitable that PS packets are set in a CPCS-PDU payload of AAL, type 5 such that a length of PS packet is equivalent to a length of the CPCS-PDU payload and a leading portion of the PS packet coincides to a leading portion of the payload. Further, it is possible that variable length PS packets are packed in sequence into the payloads with taking no account to boundaries of the payloads.

It is also possible that TS or PS packets are packed into a payload (47 bytes) of AAL, type 1. In that case, TS or PS packets are packed into a payload such that a leading portion of the TS or PS packet coincides to a leading portion of the payload as same as in the case regarding ALL, type 5. Alternatively, it is also possible that variable length packets are packed in sequence into the payloads with taking no account to boundaries of the payloads.

Figure 4:
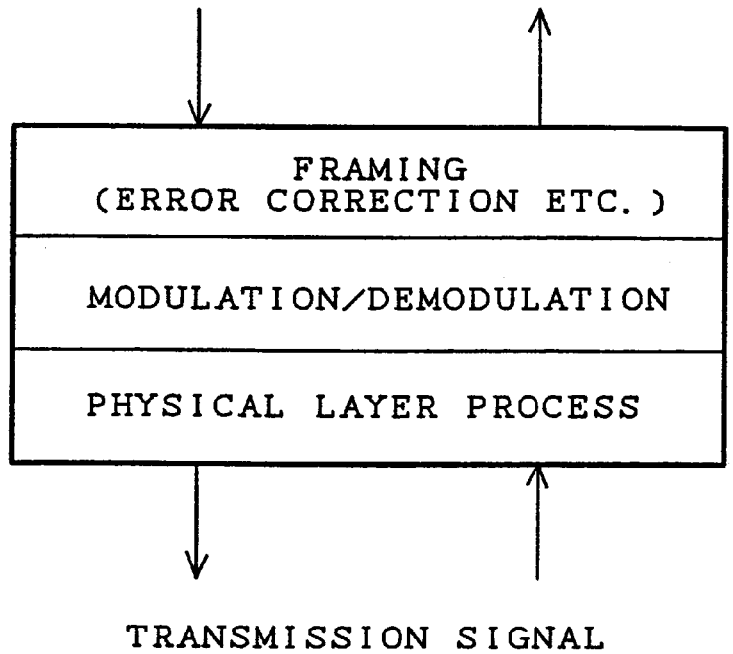
FIG. 4 is an explanatory diagram showing a general function of the section for transmission line.
Figure 5:
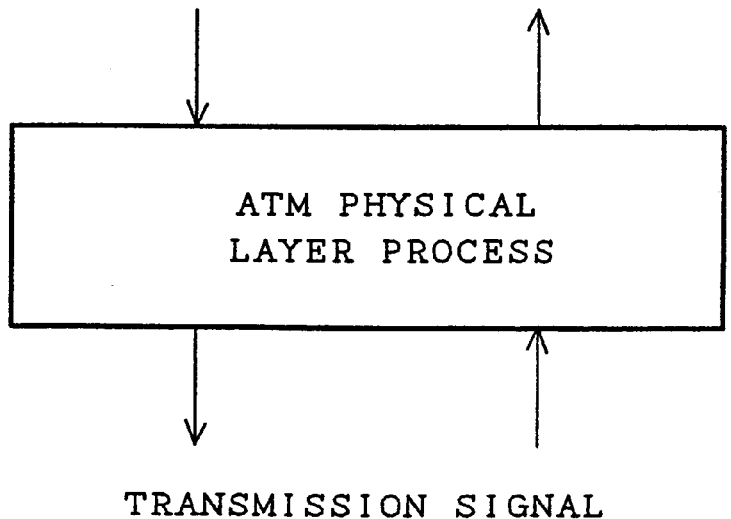
FIG. 5 is an explanatory diagram showing a general function of the transmission coding section in case an ATM network is used as a transmission line.

FIG. 4 is a block diagram showing a construction of the transmission coding section 400. The transmission coding section 400 inputs fixed length packets stream such as an ATM cells stream and produces transmission signals by framing including scrambling and adding error correction codes, modulating and performing physical layer process corresponding to a variation and a characteristic of the transmission line. In case an ATM network is used as the transmission line, the transmission coding section 400 includes a function of ATM physical layer processing as shown in FIG. 5.

As described above, according to the present embodiment, processes from a process of inputting elements of media to a process of re-multiplexing and transmitting are constructed hierarchically. Thus, such efficient multiplexing process is performed as is free from a difference between output speeds of information of media to be multiplexed, lack of media and so on. Further, since the fixed length packet generating section 300 allocates multiplexed stream 13 into a fixed length packet, the system can easily adapt to ATM cells which are fixed length packets. Moreover, since the transmission coding section 400 performs ATM physical layer processing in case an ATM network is used as a transmission line, it becomes to be possible to transmit signals which adapt to a characteristic of the ATM network.

Embodiment 2

Figure 6:
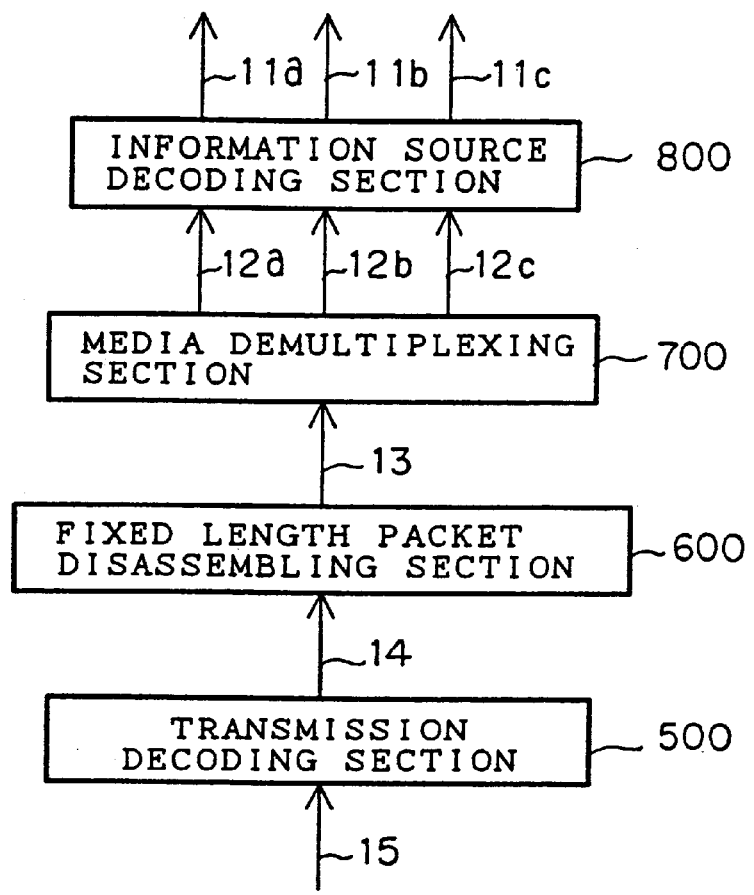
FIG. 6 is a block diagram showing a structure of a receiver in a multimedia information processing system according to the second embodiment of the present invention.

FIG. 6 is a block diagram showing another receiver of a multimedia information processing system according to the present invention. In FIG. 6, reference numeral 500 denotes a transmission decoding section for receiving a transmission signal, synchronizing a transmission frame, correcting errors in the frame and so on forth and for reproducing fixed length packets 14, 600 a fixed packet demultiplexing section for disassembling a fixed length packet 14 into a multiplexed stream 13, 700 a media demultiplexing section for reproducing coded bits streams 12a, 12b, 12c by demultiplexing a fixed length packet 14, and 800 a information-source decoding section for reproducing a video signal 11a, an audio signal 11b and a data signal 11c from the bits streams 12a, 12b, 12c.

Figure 7:
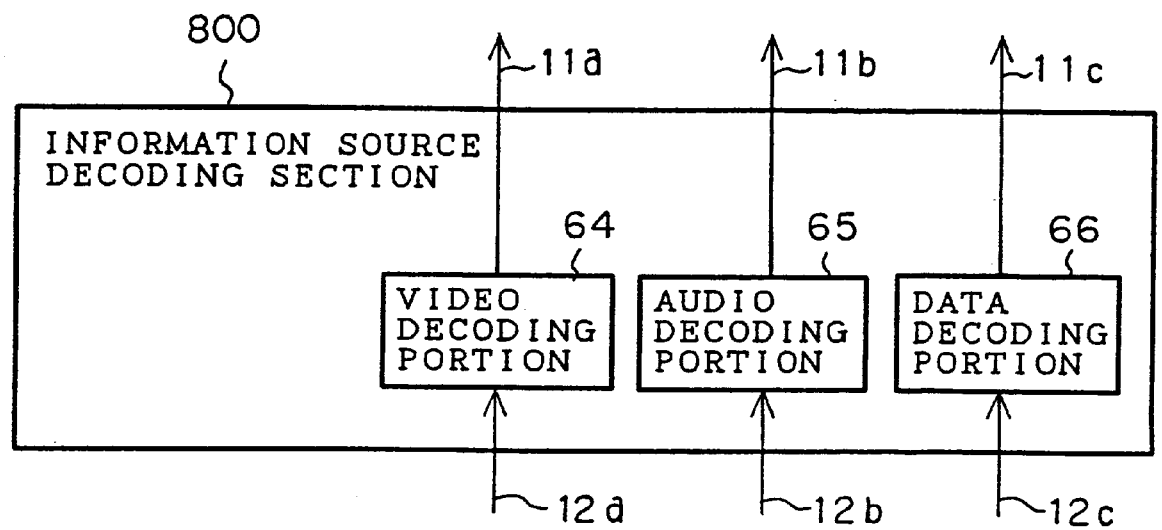
FIG. 7 is a block diagram showing a construction of information-source decoding section.

FIG. 7 is a block diagram showing a construction of the information-source decoding section 800. As shown in FIG. 7, the information-source decoding section 800 comprises a video decoding portion 64 decoding and reproducing video signals 11a, an audio decoding portion 65 decoding and reproducing audio signals 11b and a data decoding portion 66 decoding and reproducing data signals 11c.

Next, operation is described. The transmission decoding section 500 performs demodulating process when the section 500 receives a transmission signal 15. Next, the section 500 synchronizes demodulated transmission frame and reproduces a transmission frame. Further, the section 500 reproduces fixed length packets 14 by correcting errors in the frame and so forth. Here, in case an ATM network is used as a transmission line, the transmission decoding section 500 should include a function of ATM physical layer processing as shown in FIG. 5.

The fixed packet demultiplexing section 600 extracts payloads from fixed length packets 14 and reproduces a multiplexed stream 13. In case the fixed length packet 14 is an ATM cell, a multiplexed stream 13 based on TS packets is reproduced as shown in FIG. 5. The media demultiplexing section 700 demultiplexes the multiplexed stream into a video coded stream 12a, an audio coded stream 12b and a data coded stream 12c according to ISO/IEC 13813-1 (MPEG-2 SYSTEM) standard.

In the information-source decoding section, the video decoding portion 64 reproduces video signals 11a from the video coded stream 12a by contrary processing of the processing in the video coding portion 61. The audio decoding portion 65 reproduces audio signals 11b from the audio coded stream 12b by contrary processing of the processing in the audio coding portion 62. The data decoding portion 66 reproduces data signals 11c from the data coded stream 12c by contrary processing of the processing in the data coding portion 63.

As described above, according to the present embodiment, processes from a receiving process to reproducing process of elements of media are constructed hierarchically. Thus, such efficient demultiplexing process is performed as is free from a difference between input speeds of information of media, lack of media and so on. Further, since the fixed length packet demultiplexing section 600 extracts multiplexed stream 13 from fixed length packets, the system can easily adapt to ATM cells which are fixed length packets. Moreover, since the transmission decoding section 500 performs ATM physical layer processing in case an ATM network is used as a transmission line, it becomes to be possible to receive and decode transmitted signals which adapt to a characteristic of the ATM network.

Embodiment 3

Figure 8:
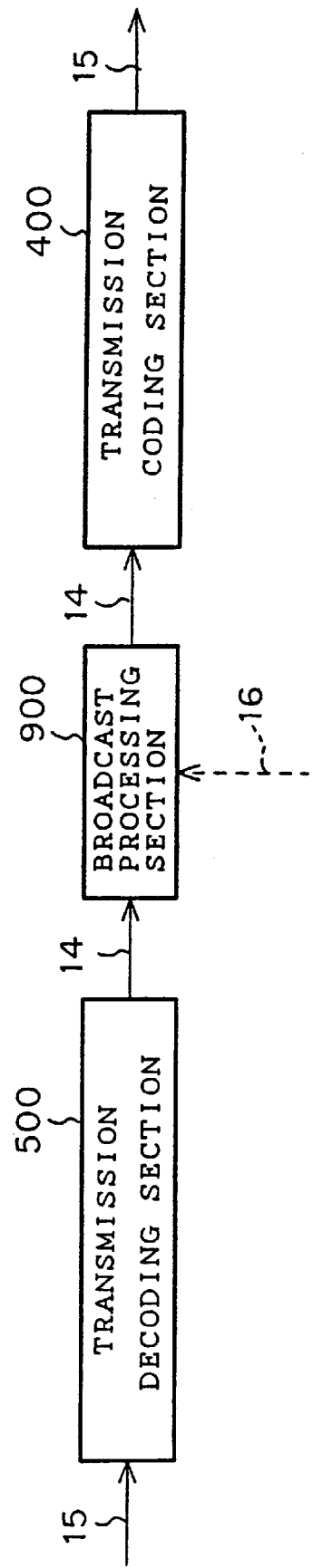
FIG. 8 is a block diagram showing a structure of a relay station in a multimedia information processing system according to the third embodiment of the present invention.

FIG. 8 is a block diagram showing a relay station of a multimedia information processing system according to the present invention. In FIG. 8, reference numeral 400 denotes a transmission coding section for producing a transmission signal 15, 500 a transmission decoding section for receiving a transmission signal, synchronizing a transmission frame, correcting errors in the frame and so on forth and for reproducing fixed length packets 14, and 900 a broadcast processing section for adding information based on destination address information 16 to a fixed length packet 14 if necessary. The broadcast processing section 900 is an example of signal change processing means for changing signals of a fixed length packet stream. The section 900 can perform signal changing process, address adding process in this case, for a fixed length packet stream which is independent from a characteristic of each transmission line connected to the system.

Figure 9:
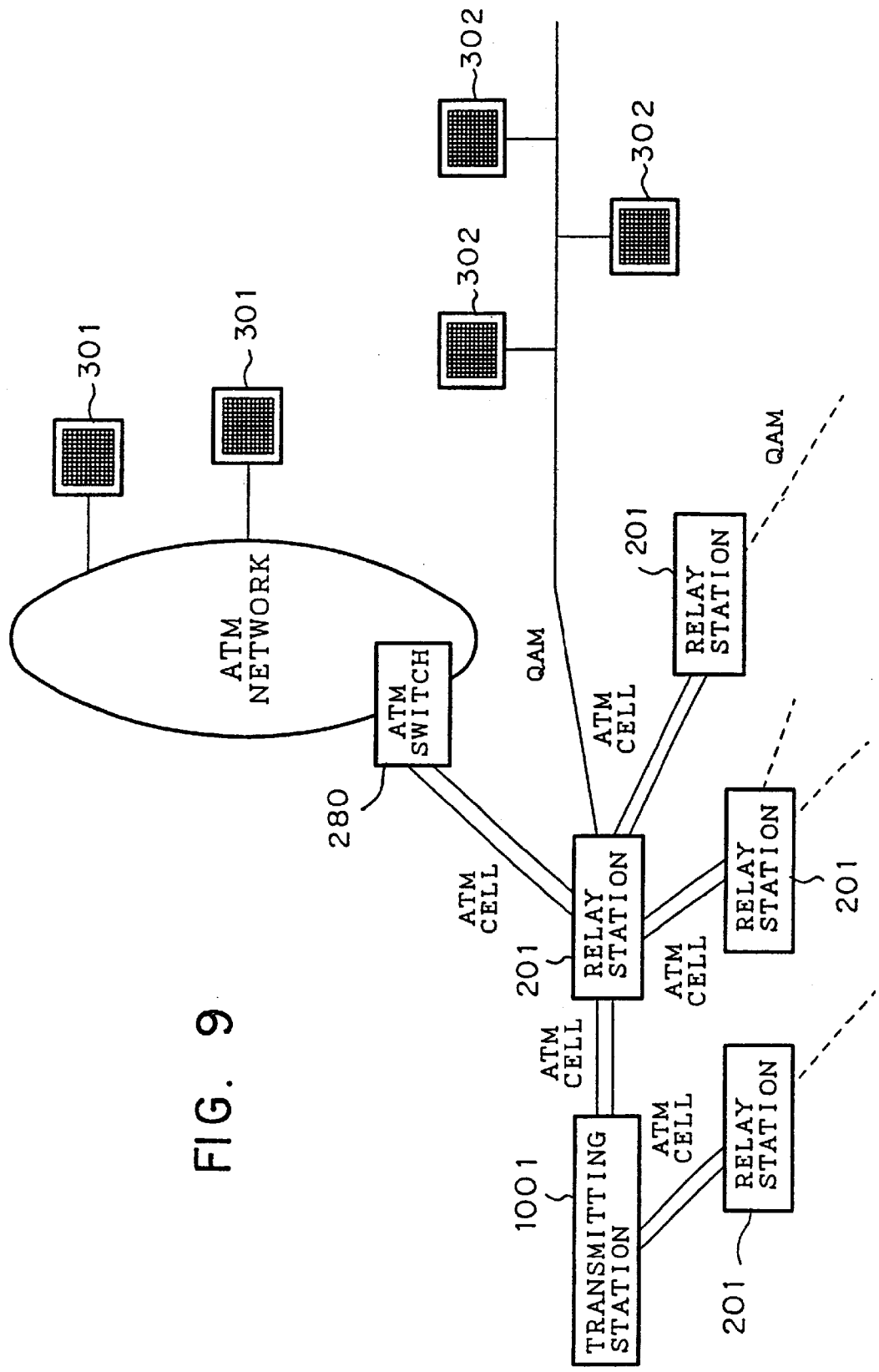
FIG. 9 is a connection diagram showing a connection of multimedia information processing systems.
Figure 10:
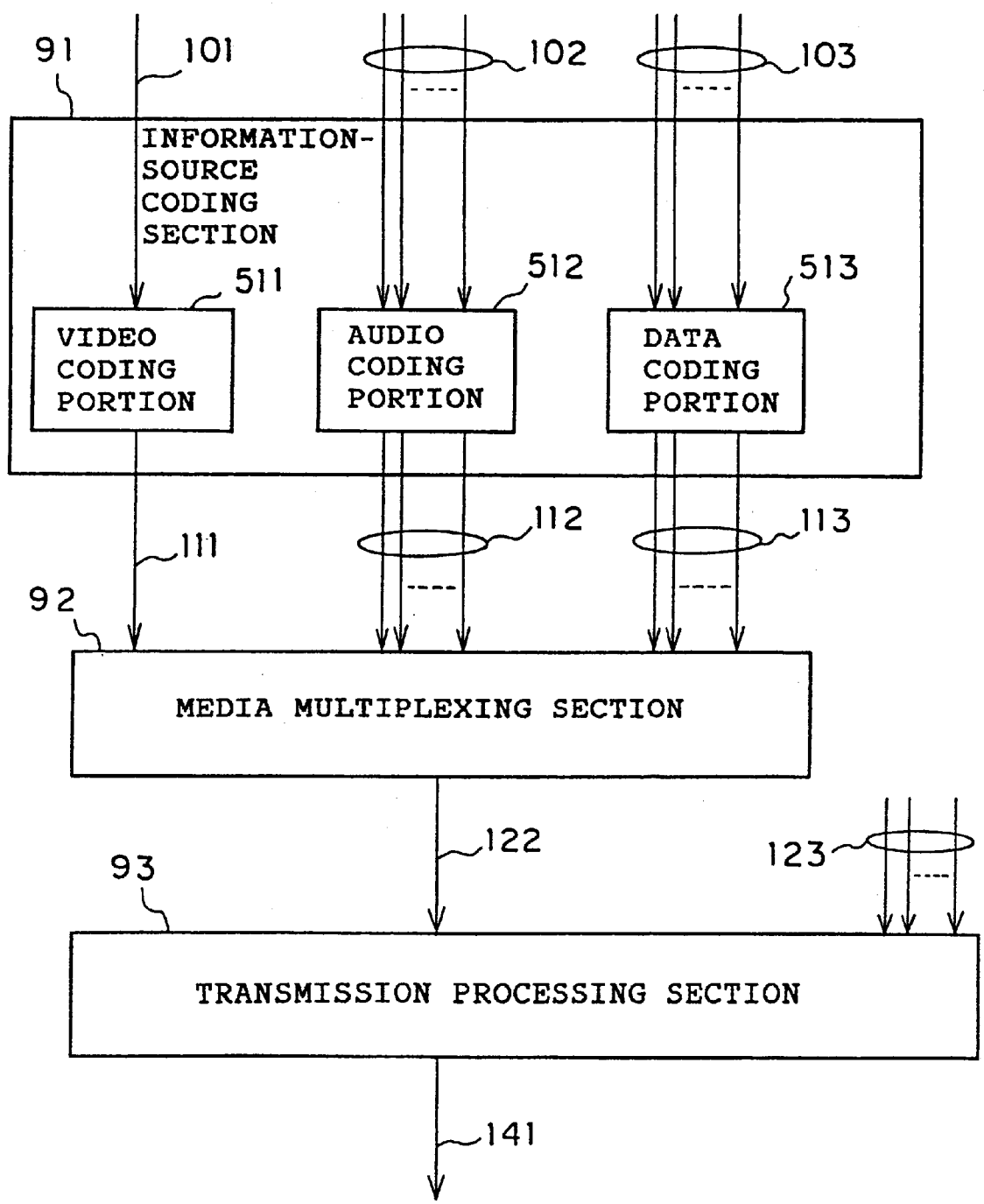
FIG. 10 is a block diagram showing a structure of a transmitter in a conventional multimedia information processing system.
Figure 11:
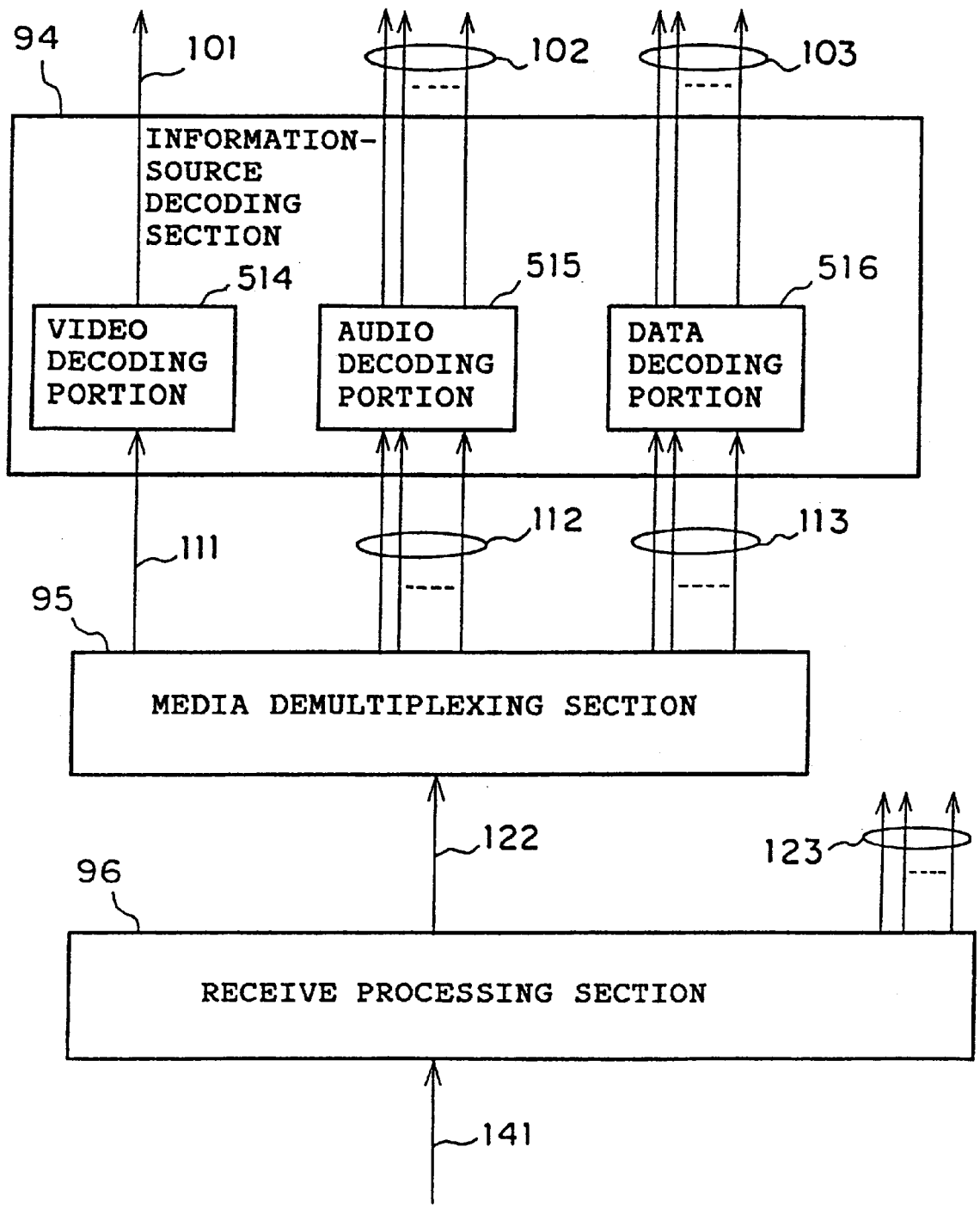
FIG. 11 is a block diagram showing a structure of a receiver in a conventional multimedia information processing system.
Figure 12:
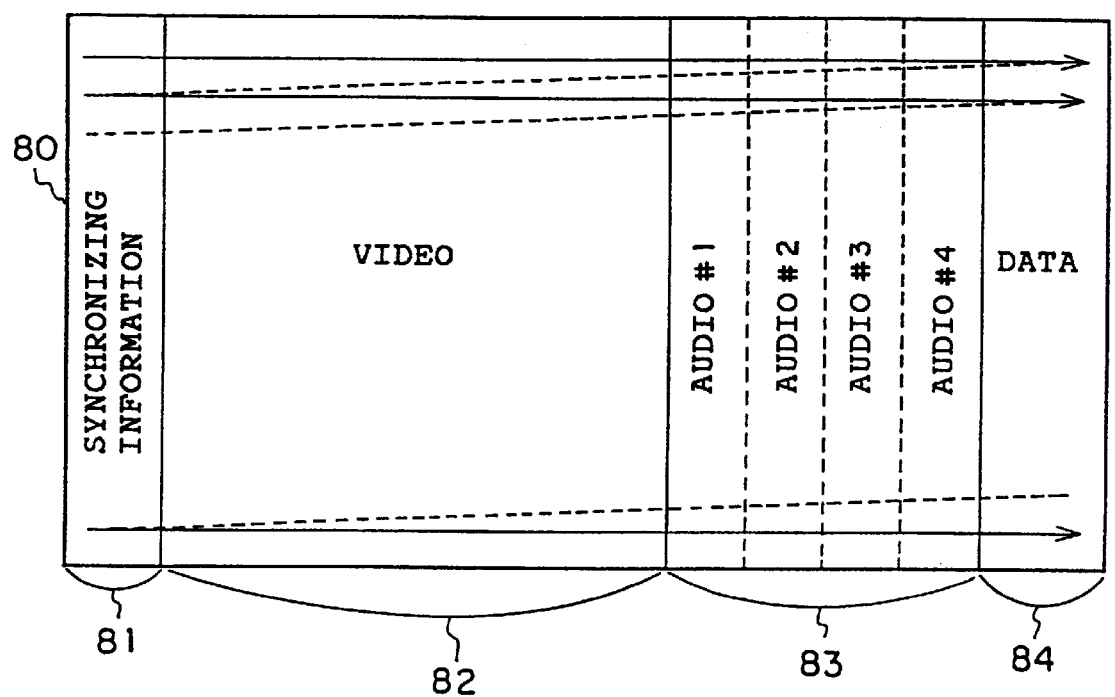
FIG. 12 is a view explaining a structure of a multiplexed frame in a multimedia information processing system.

FIG. 9 is a system construction diagram showing an aspect of connections between multimedia information processing systems. In FIG. 9, 1001 denotes a transmission station, 201 a relay station, 301 a receiver on an ATM network connected to a relay station 201 through an ATM switch 280, 301 a receiver connected directly to a relay station.

Next, operation is described. In the system shown in FIG. 9, relay stations 201 are connected to the transmission station 1001 through an ATM network. It will be explained that a relay station 201 connected to the ATM switch 280 and the receivers 302 transmits a transmission signal from the transmission station 1001 to the receivers 301 through the ATM switch 280. Here, ATM cells are used as fixed length packets 14 for example. Thus, in each relay station 201, the transmission decoding section 500 includes a function of ATM physical layer processing as shown in FIG. 5. Further, the transmission coding section 400 in each relay station 201 connected to the ATM switch 280 among all relay stations 201 includes a function of ATM physical layer processing as shown in FIG. 5.

The transmission decoding section 500 in the relay station 201, which is connected to the ATM switch 280, receives a transmission signal 15 from the transmission station 1001 and reproduces fixed length packets 14. The packets 14 are transferred to the broadcast processing section 900. The broadcast processing section 900 reproduces a plurality of fixed length packets 14 for destination receivers by copying input fixed length packet 14. The section 900 adds each address to a header of each packet 14. Each packet 14 is transferred to the transmission coding section 400. The section 400 delivers each packet 14 to each address. In this case, the section 400 delivers the packet 14 to the ATM network through the ATM switch 280. In the ATM network, each packet 14 is transferred to each receiver 301 corresponding to the address.

Next, it will be explained that a relay station 201 connected to the ATM switch 280 and the receivers 302 transmits a transmission signal from the transmission station 1001 to the receivers 302. Here, each receiver 301 can receive a signal modulated by QAM. Thus, the transmission coding section 400 in each relay station 201, which is connected to the ATM switch 280 and receivers 302, includes a function of a framing process containing scrambling process and error correcting process, modulating process of QAM modulation for example, and physical layer process as shown in FIG. 4 in addition to the ATM physical layer process as shown in FIG. 5.

The transmission decoding section 500 in the relay station 201 receives a transmission signal 15 from the transmission station 1001 and reproduces fixed length packets 14. The packets 14 are transferred to the broadcast processing section 900. In this case, the broadcast processing section 900 transfers the packet 14 to the transmission coding section 400 as it is. The section 400 produces a transmission signal 15 based on QAM modulation from input packets 14. The transmission signal 15 is transmitted to the receivers 302.

In this embodiment, a relay station 201 which does not include the ATM network as a destination of transmitted signals, can be constructed without a broadcast processing section 900.

As described above, since the relay station is constructed such that the transmission decoding section 500 reproduces a fixed length packet stream instead of a multiplexed bits stream from received transmission signal 15 and the transmission coding section 400 changes the fixed length packet stream into a transmission signal 15 corresponding to a characteristic of the transmission line, the construction for exchanging signals between different transmission means is simplified. In other words, it is achieved to exchange contents of media between different transmission means by a simple construction. In addition, exchanging of contents is performed faster than that in the conventional system. Further, a transmission of contents through a plurality of transmission means is rapidly performed by simpler construction.

Figure 13:
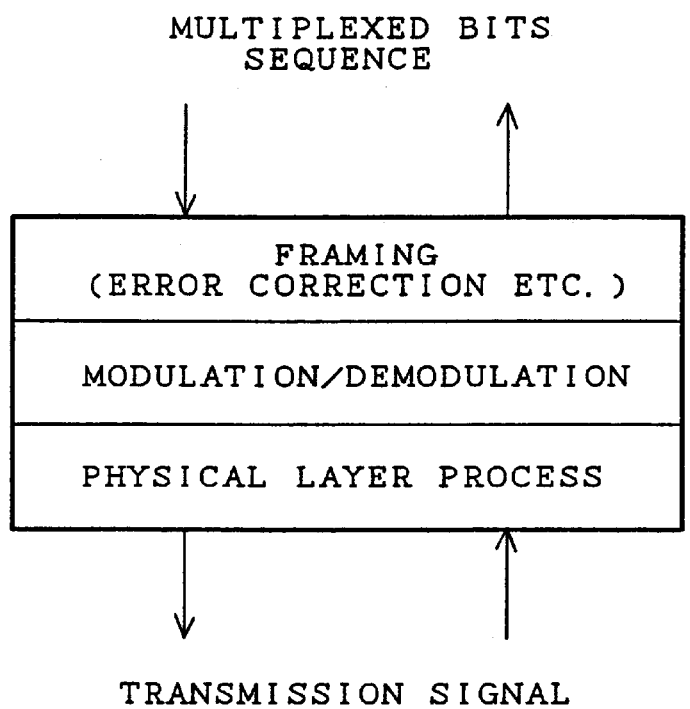
FIG. 13 is an explanatory diagram showing a general function of the transmission processing section and the receive processing section in case ATM network is not used.
Figure 18:
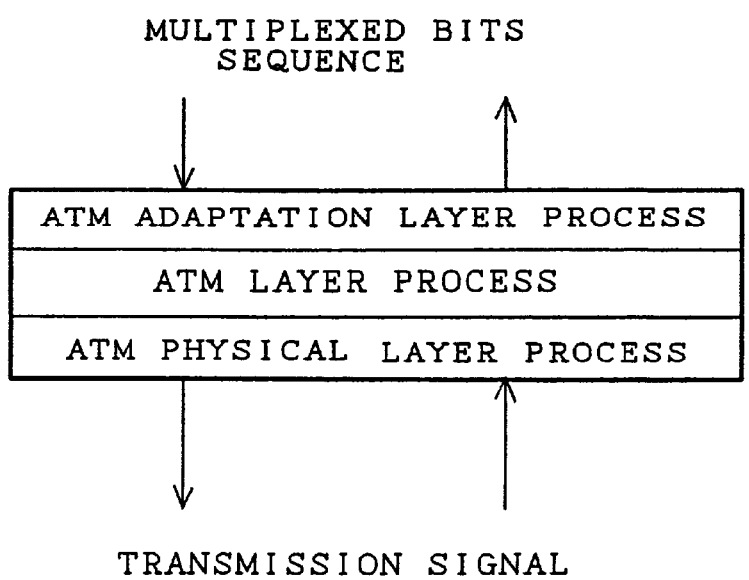
FIG. 18 is a explanatory diagram showing a general function of the transmission processing section and the receive processing section in case ATM network is used.
Figure 14A:
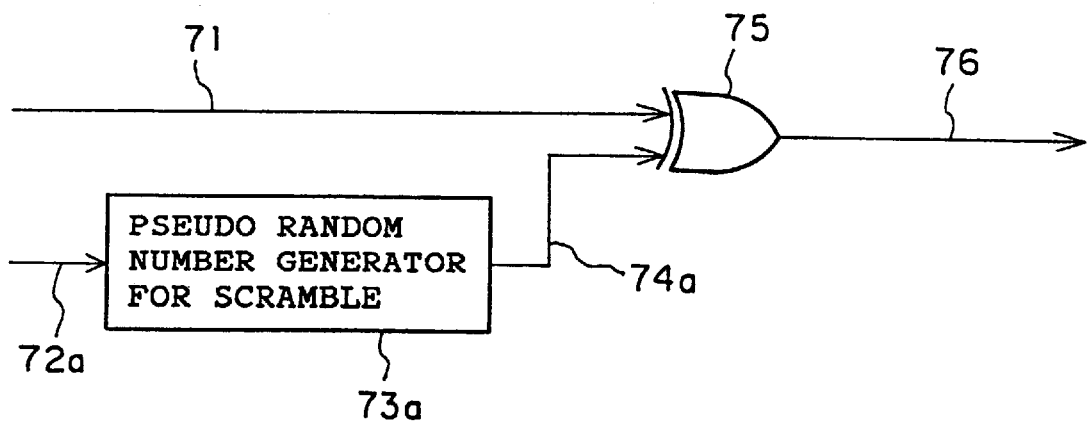
FIG. 14(a) is a view explaining scramble processing in a multimedia information processing system.
Figure 14B:
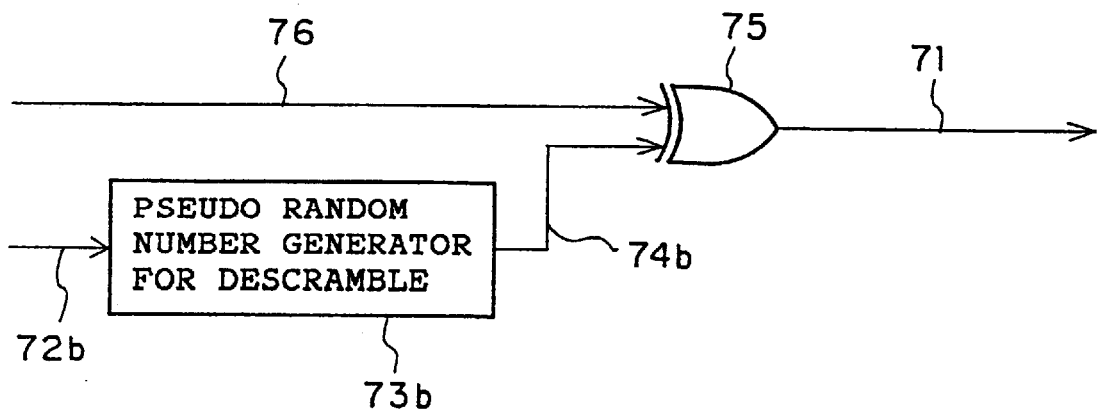
FIG. 14(b) is a view explaining de-scramble processing in a multimedia information processing system.
Figure 15:
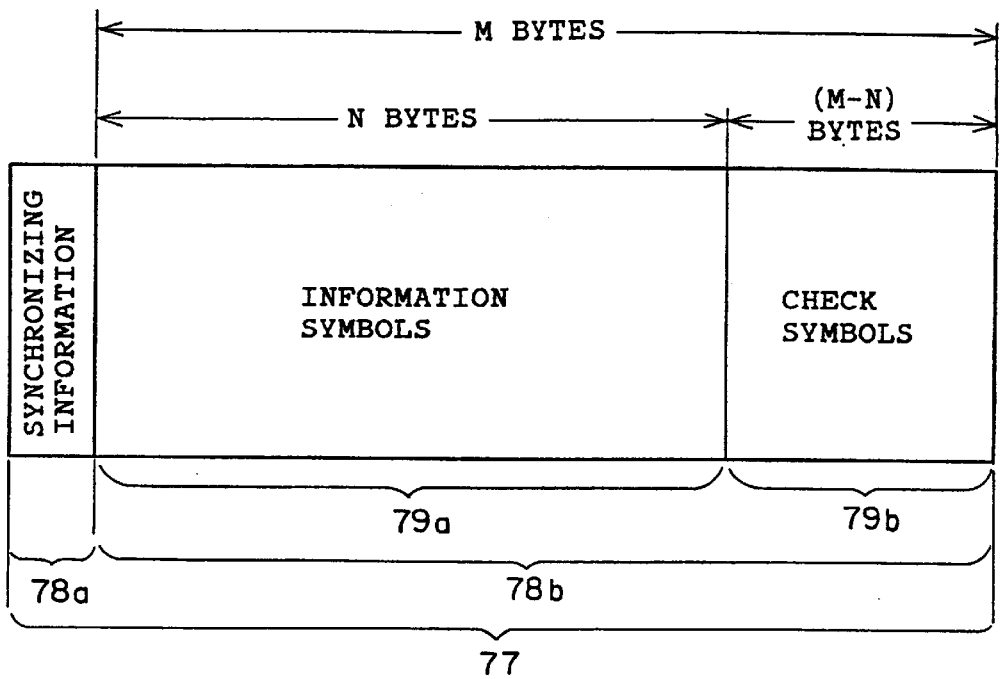
FIG. 15 is a block diagram showing a structure of an error correction frame when a Reed-Solomon code is used as an error correction code.
Figure 16:
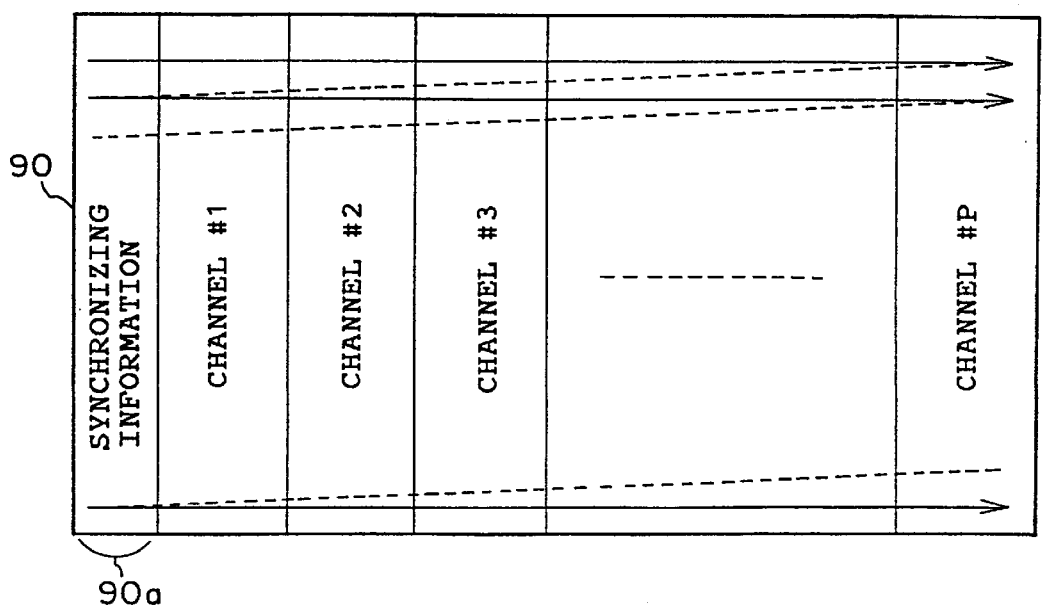
FIG. 16 is a view explaining a structure of a channel multiplexed frame in a multimedia information processing system.
Figure 17:
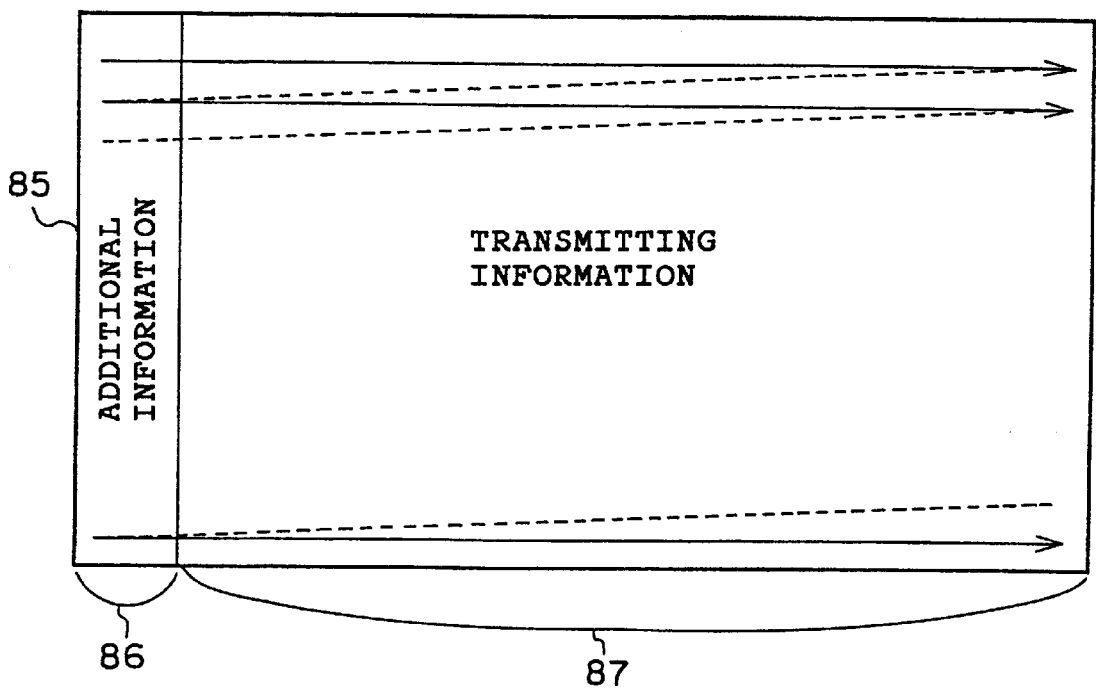
FIG. 17 is a view explaining a structure of a transmission frame in a multimedia information processing system.

For example, the transmission coding section 400 for transmitting a signal based on QAM or PSK modulation is constructed as shown in FIG. 4. The transmission decoding section 500 for receiving a signal based on QAM or PSK modulation is also constructed as shown in FIG. 4. The transmission coding section 400 for transmitting a signal to an ATM network is constructed as shown in FIG. 5. The transmission decoding section 500 for receiving a signal to an ATM network is also constructed as shown in FIG. 5. Thus, an adapter for exchanging contents of media between a multimedia information processing system connected to an ATM network and another multimedia information processing system connected to a transmission means transmitting QAM modulated wave may include functions shown in FIGS. 4 and 5. In the conventional system, an adapter should include functions shown in FIGS. 13 and 18.

In this embodiment, a fixed packets stream is transferred between the transmission decoding section 500 and the transmission coding section 400 in the relay station 201. In case an ATM cells stream are utilized as the fixed packets stream, the transmission decoding section 500 reproduces an ATM cells stream from an ATM transmission signal outputted from an ATM network or a QAM modulated wave as a transmission signal. The transmission coding section 400 produces an ATM transmission signal or a QAM modulated wave as a transmission signal from an ATM cells stream. Thus, exchanging of contents of media between an ATM network and a non-ATM network is rapidly performed by a simplified construction.

Since a fixed packets stream is transferred between the transmission decoding section 500 and the transmission coding section 400, the broadcast processing section 900 can add destination addresses to the fixed packets stream directly. Thus, a broadcast transmission is easily achieved.

The invention being thus described, it will be obvious that the same may be varied in many ways, such variations are not to be regarded as a departure from the spirit and scope of the invention, and all such modifications as would be obvious to one skilled in the art are intended to be included within the scope of the following claims.

What is claimed is:

1. A multimedia information processing system for facilitating transmission of multimedia information over different types of transmission media, comprising:

information-source coding processing means including a plurality of different coding sections, each coding section inputting one of a plurality of media information of different types, each coding section independently coding each type of media information regardless of and independent to the type of transmission media utilized to transmit the media information, wherein each type of media information is to be transmitted on one of the different types of transmission media;

packet multiplexing means for producing a multiplexed stream by packet-multiplexing coded bit streams produced by said information-source coding processing means, wherein each of the coded bit streams is independent to the other coded bit streams;

fixed length packet producing means for allocating said multiplexed stream into fixed length packets; and transmission coding means for producing a transmission signal from said fixed length packets, said transmission coding means coding the transmission signal in a manner depending upon the corresponding type of transmission medium.

2. The multimedia information processing system according to claim 1, wherein said fixed length packet producing means allocates the multiplexed stream into an ATM cell.

3. The multimedia information processing system according to claim 2, wherein said transmission coding means executes transmission processing of ATM physical layer.

4. The multimedia information processing system according to claim 1, wherein said transmission coding means executes transmission processing of ATM physical layer.

5. A multimedia information processing system for facilitating transmission of multimedia information over different transmission media, comprising:

information-source coding processing means including a plurality of different coding sections, each coding section inputting one of a plurality of media information of different types, each coding section independently coding each type of media information regardless of and independent to the type of transmission media utilized to transmit the media information, wherein each type of media information is to be transmitted on one of the different types of transmission media;

packet multiplexing means for producing a multiplexed stream by packet-multiplexing coded bit streams produced by said information-source coding processing means, wherein each of the coded bit streams is independent to the other coded bit streams;

fixed length packet producing means for allocating said multiplexed stream into fixed length packets;

transmission coding means for producing a transmission signal from said fixed length packets, said transmission coding means coding the transmission signal in a manner depending upon the corresponding type of transmission medium, wherein the system receives transmission signals over the different types of transmission media;

transmission decoding means for reproducing fixed packet streams from the received transmission signal;

wherein the received transmission signals encode a plurality of media information of different types and wherein each type of media is received over one of the different transmission media;

said transmission decoding means reproducing fixed packet streams in a manner depending upon the type of transmission media utilized to transmit the corresponding transmission signals;

fixed length packet disassembling means for disassembling said fixed packet streams to extract payloads and reproduce a multiplexed stream;

media separating means for reproducing coded bit streams for respective types of media from said multiplexed stream, wherein each of the coded bit streams is independent to other coded bit streams; and information-source decoding processing means for decoding said coded bit streams for respective types of media.

6. The multimedia information processing system according to claim 5, wherein said fixed length packet disassembling means extracts the multiplexed stream from an ATM cells stream.

7. The multimedia information processing system according to claim 5, wherein said transmission decoding means executes receive processing of ATM physical layer.

8. The multimedia information processing system according to claim 6, wherein said transmission decoding means executes receive processing of ATM physical layer.

* * * * *